United States Patent [19]

Hueckler et al.

[11] Patent Number: 4,896,740
[45] Date of Patent: Jan. 30, 1990

[54] WHEEL BEARING SUPPORT

[75] Inventors: Volker Hueckler, Radolfzell; Ulrich Eckhardt, Altrip, both of Fed. Rep. of Germany

[73] Assignee: Deere & Company, Moline, Ill.

[21] Appl. No.: 134,633

[22] Filed: Dec. 18, 1987

[30] Foreign Application Priority Data

Dec. 23, 1986 [DE] Fed. Rep. of Germany ....... 3644143

[51] Int. Cl.$^4$ ...................... B60B 27/04; B60K 17/22; B60K 17/30
[52] U.S. Cl. .................................. 180/255; 74/421 R; 74/390; 301/5 R; 301/41 R
[58] Field of Search ............... 180/254, 255, 256, 257, 180/258, 259, 260, 261, 262, 10, 65.6; 74/390, 421 R; 301/5, 41 R

[56] References Cited

U.S. PATENT DOCUMENTS

| 1,184,814 | 5/1916 | Bollstrom | 180/255 X |
| 1,316,918 | 9/1919 | Nogrady | 180/255 |
| 1,381,597 | 6/1921 | Schifferle | 180/10 |
| 1,396,102 | 11/1921 | Dunham et al. | 180/255 |
| 1,427,584 | 8/1922 | Denison | 74/390 |
| 2,134,687 | 11/1938 | Dunham | 74/390 X |
| 2,357,742 | 9/1944 | Jeffrey | 180/253 |
| 4,418,785 | 12/1983 | Ehrlinger et al. | 180/255 |

FOREIGN PATENT DOCUMENTS

| 201444 | 1/1959 | Austria | 74/421 R |
| 272567 | 6/1988 | European Pat. Off. | 180/255 |
| 1430050 | 10/1968 | Fed. Rep. of Germany . | |
| 2154474 | 5/1972 | Fed. Rep. of Germany . | |
| 2930298 | 2/1983 | Fed. Rep. of Germany . | |
| 2136160 | 12/1972 | France . | |
| 2351322 | 12/1977 | France . | |
| 912556 | 3/1982 | U.S.S.R. | 180/65.6 |
| 164108 | 6/1921 | United Kingdom | 180/65.6 |

Primary Examiner—Mitchell J. Hill

[57] ABSTRACT

A wheel bearing support with an eccentric drive has a drive shaft extending through the input side bearing arrangement. A gear is provided around the internal circumference of the wheel hub, which is driven by the drive shaft via intermediate gears. Various bearing arrangements provide minimum axial length and torsional moment.

17 Claims, 6 Drawing Sheets

WHEEL BEARING SUPPORT

BACKGROUND OF THE INVENTION

1. Field of the Invention

The invention relates to a wheel bearing support for a steerable driven wheel having a drive shaft and a wheel hub, where the rotational axis of the drive shaft is eccentric to the rotational axis of the wheel hub, and where the wheel hub is rotatably mounted on a wheel bearing support carrier by means of an input side and an output side bearing arrangement.

2. Description of the Related Art

U.S. Pat. No. 4,418,785 (Ehrlinger et al.) teaches a wheel bearing support with an eccentric drive in which the drive shaft drives the wheel hub by means of a set of spur gears. The wheel hub is rotatably mounted by a pair of tapered roller bearings which are located as close to each other as possible, and are separated only by a load-absorbing shoulder. In this arrangement, the risk of encountering excessive loads can be limited only by arranging the tapered roller bearings as close as possible to the central plane of the wheel.

This wheel bearing support suffers from the disadvantage that torque must be transmitted to the wheel hub by means of a shaft which is restricted in diameter by the surrounding bearings, and hence is subject to high stresses. In addition, high loads are experienced in the wheel bearing support carrier, the wheel hub and the bearings, since they can develop only limited moment capacity in their seats due to their close proximity to each other.

SUMMARY OF THE INVENTION

The purpose of the present invention is to reduce these stresses in the wheel bearing support while maintaining a compact design with an eccentric drive.

This purpose is accomplished according to the present invention by rigidly attaching an internal gear to the wheel hub. This internal gear is driven by the drive shaft, which extends through an annular space in the input side bearing arrangement.

With this structure, torque can be transmitted directly into the wheel hub through the internal gear, which has a generously proportioned diameter. The internal gear may be machined as part of the wheel hub, or it may be attached by positive and/or friction locking means. Since the internal gear has a diameter large enough to surround almost the entire wheel bearing support, it is subject to lower torque than the shaft of the known bearing support. In addition, because the input side bearing arrangement surrounds the drive shaft, it can be located relatively far from the output side bearing arrangement, even at the other end of the wheel bearing support. The support spacing resulting from this arrangement provides a large support moment resulting in a lower and more balanced stress pattern compared to the known wheel bearing support.

Proper selection and positioning of the bearings making up the bearing arrangements can ensure complete absorption of the imposed loads, radial as well as axial. In addition, costs can be reduced significantly since two very small output side tapered roller bearings can be used in this structure, even for large diameter wheels.

The present invention also provides a particularly compact arrangement for intermediate gears in the final drive, so that even with wheels of reduced width mounted on the wheel hub, the hub will protrude beyond the wheel only a minimal amount, or not at all.

BRIEF DESCRIPTION OF THE DRAWINGS

The present invention will be described in greater detail below with reference to the following drawings.

DETAILED DESCRIPTION OF THE PREFERRED EMBODIMENTS

Figure 1:
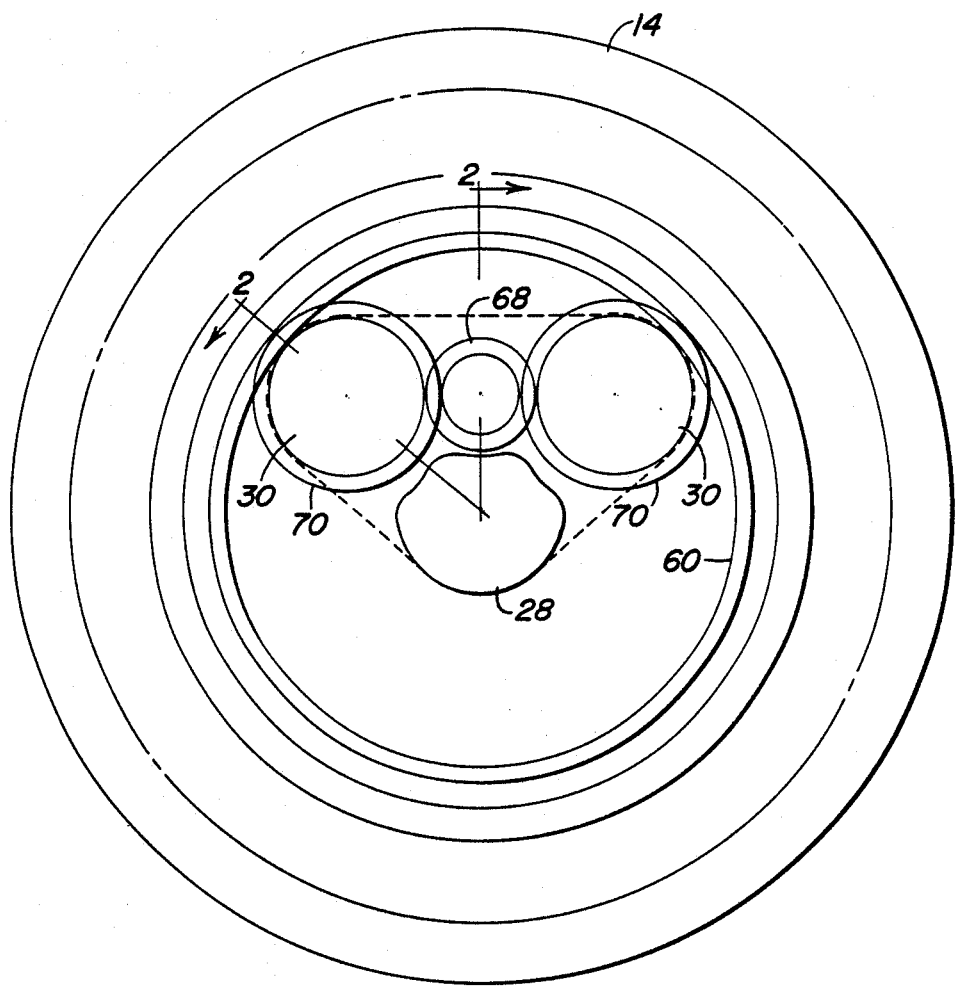
FIG. 1 is a schematic end view of a wheel bearing support according to a first embodiment of the present invention.
Figure 2:
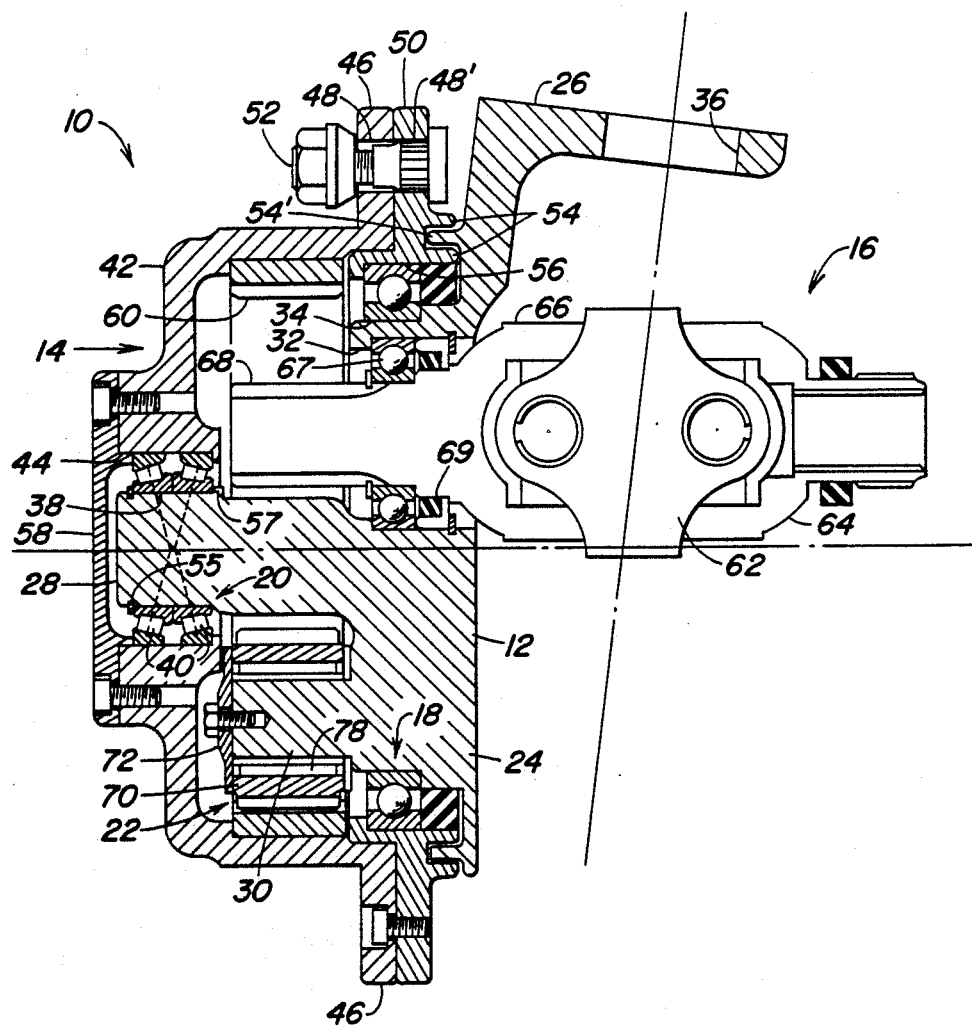
FIG. 2 is a cross-section along the lines 2—2 in FIG. 1.
Figure 3:
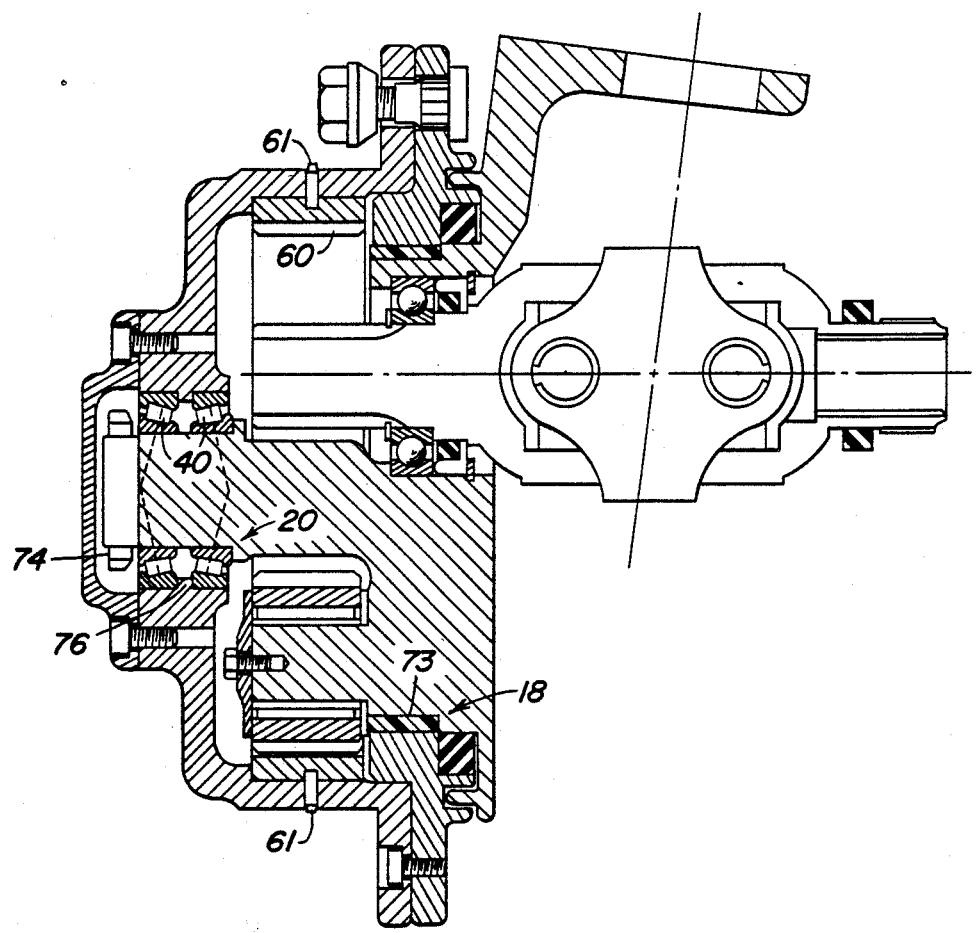
FIG. 3 is a view similar to FIG. 2, but with a journal-bearing type input side bearing arrangement.
Figure 4:
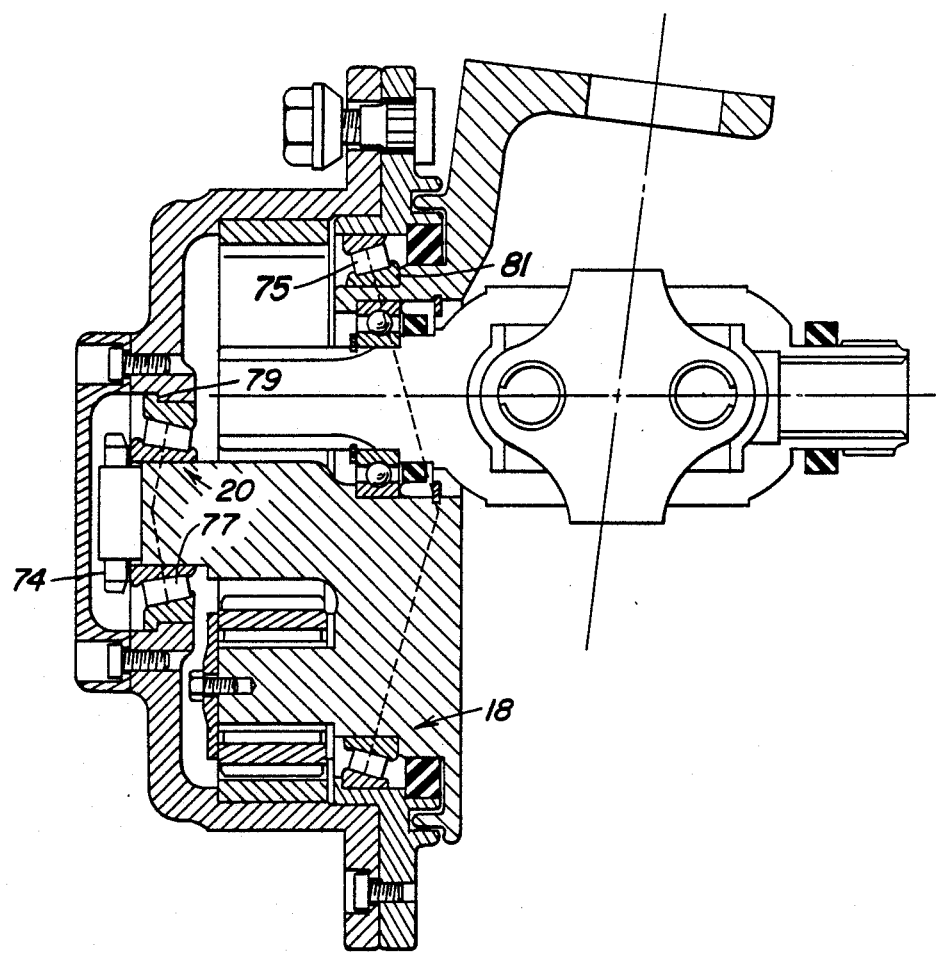
FIG. 4 is a view similar to FIG. 1, but with a tapered roller bearing type input side bearing arrangement.

FIG. 1 is a schematic end view of a first preferred embodiment according to the present invention. Note that the view lines for FIGS. 2, 3 and 4 are taken through an angle rather than in a plane to best illustrate the operation of the apparatus.

This operation is more clearly described by reference to FIG. 2. A wheel bearing support 10 according to the present invention includes a wheel bearing support carrier 12, a wheel hub 14, a drive shaft 16, an input side bearing arrangement 18, an output side bearing arrangement 20, and a single step reduction gear 22.

The wheel bearing support 10 is attached to a front axle, not shown, of, e.g., an agricultural tractor, and is rotated in a horizontal or nearly horizontal plane by a steering linkage, also not shown. The wheel bearing support 10 transmits power between an axle unit with front wheel drive and a driven wheel. Of course, the wheel bearing support may also be used in the rear wheel drive of a motor vehicle, e.g., a combine or self-propelled chopper.

The wheel bearing support carrier 12 is a pivoted part which includes a generally circular plate 24 and a fork 26. Only the top portion of the fork 26 is shown due to the angle taken for this cross section. In a planar cross section, a second tine of the fork 26 would appear below the shaft 16. The carrier 12 is connected to the axle unit by a king pin (not shown) through openings 36 in the fork 26. The king pin preferably has a slight forward inclination to provide a negative steering roll radius. The entire wheel bearing support carrier 12, including the circular plate 24 and fork 26, preferably is formed of a single piece.

The circular plate 24 has the fork 26 extending from one side thereof, and a support journal 28 and two gear journals 30 (see FIG. 1) from the other side thereof. The plate 24 extends perpendicular to the support plane of the wheel, and includes an opening 32 that permits insertion of the drive shaft 16. Space also is provided around the plate 24 for a bearing seat 34.

The support journal 28 extends centrally and axially from the plate 24 outward, that is, to the left in the drawing, and carries a bearing seat 38 at its outer end for the mounting of one or more tapered roller bearings 40.

The gear journals 30 are parallel to the rotational axis of the wheel, which in this example, coincides with the center line of plate 24 and the longitudinal center line of the support journal 28. Preferably, two gear journals 30 are provided somewhat above the support journal 28, as best seen in FIG. 1. Returning to FIG. 2, the gear journals 30 are shorter and of smaller diameter than the support journal 28.

Figure 6:
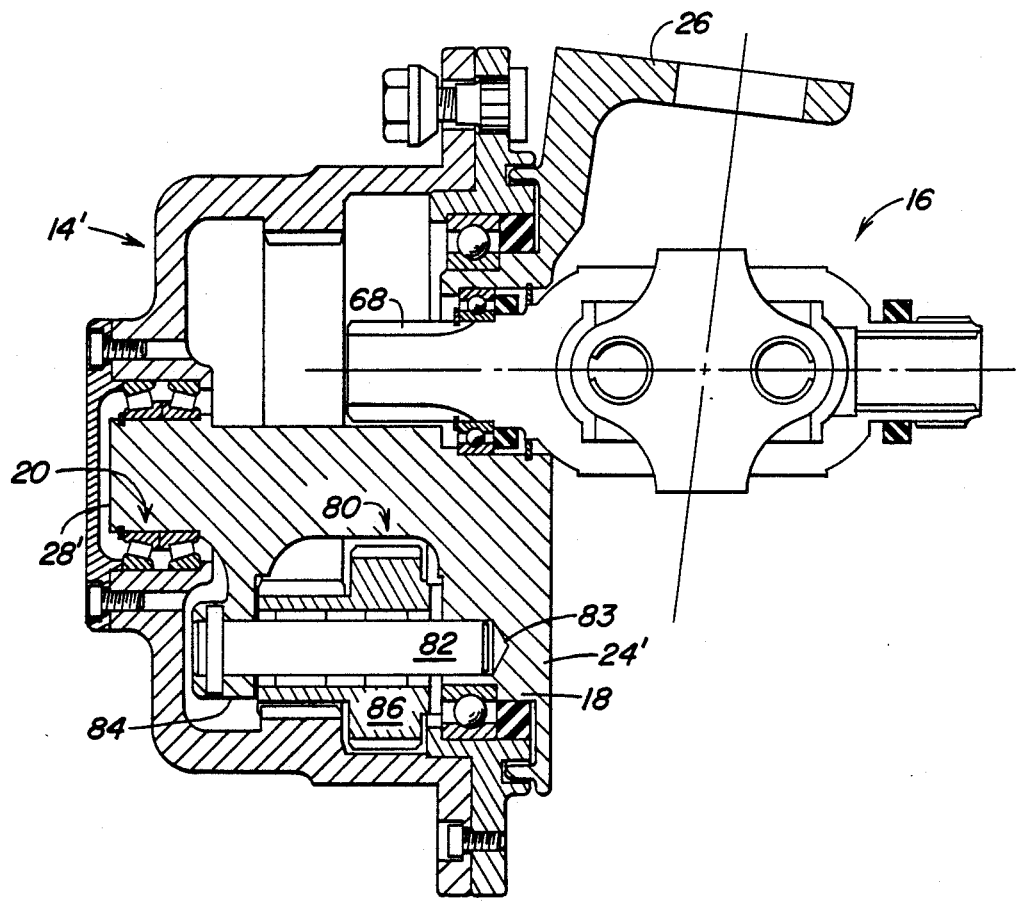
FIG. 6 is a view similar to FIG. 2, but taken along the lines 6—6 in FIG. 5.

The wheel hub 14 is bell-shaped, and its dome 42 has a bore 44 therein in which tapered roller bearings 40 are mounted and about which the hub 14 is dynamically balanced. At the end opposite the bore 44, the hub 14 has a collar 46 with through holes 48. A circular washer 50, preferably of cast iron, and of approximately the same size as the collar 46 with corresponding through holes 48' is axially in contact with the collar 46. The through holes 48, 48' accept bolts 52, which serve to attach a removable wheel (not shown) to the wheel hub 14. Two sealing lips 54 extend axially from the circular washer 50, and the inside diameter of the circular washer 50 is finished as a bearing seat 56. Sealing lips 54 engage a sealing lip 54' attached to or extending from the plate 24, together forming a concentric labyrinth seal. A removable cover 58 is provided to close the dome of the bell 42 in the area of the bore 44. An internal gear 60 is provided on the inside of the mouth of the bell to form a part of the reduction gear. Preferably, the internal gear 60 is retained in the wheel hub 14 by a press-fit to lock it against rotation, or is milled directly into the wheel hub, e.g., as shown in FIG. 6.

The wheel hub 14 is supported at one end on the plate 24 by the input side bearing arrangement 18, and at its other end on the support journal 28 by the output side bearing arrangement 20. The input side bearing arrangement 18 shown in FIG. 2 is of the ball bearing-type mounted between bearing seat 34 on the plate 24 and bearing seat 56 on the circular washer 50. The output side bearing arrangement 20 has two tapered roller bearings, in an "X" configuration, mounted in the bore 44 and on the bearing seat 38, where they are retained axially by two stops 55, 57. By virtue of these bearings, the wheel hub 14 can rotate on its axis about support journal 28.

The drive shaft 16 contains a constant velocity universal joint 62 whose center lies on the longitudinal line of the king pin, and which contains an input side 64 and an output side 66. The output side 66 has a drive gear 68 rigidly attached to it, and extends through the opening 32 to the inside of the internal gear 60. Between the outer periphery of the output side 66 and the inner periphery of the opening 32, a rolling contact or journal bearing seal 69 is provided which is conventionally designed and attached.

The single reduction gear 22 includes the drive gear 68 and the internal gear 60, as well as two intermediate gears 70, with the drive gear 68 and intermediate gears 70 positioned radially inside of the internal gear 60. The intermediate gears 70 are each rotatably mounted on gear journals 30 by needle bearings 78, while held against axial movement by a threaded washer 72. The intermediate gears 70 mesh with the drive gear 68 and with the internal gears 60, so that power can be transmitted over the shortest path from the drive shaft 16 to the wheel hub 14.

By locating the input side bearing ring arrangement 18 very close to the axle unit, the distance to the output side bearing arrangement 20 can be increased, resulting in a large support moment. At the same time, since the distance between the center of the universal joint 62 and the left end of the collar 46 is short, a more compact design is provided and a lower moment load is placed on the fork 26. In addition, the power is transmitted through components which are all in a substantially vertical plane, so that torsional moments are generally eliminated.

FIG. 3 depicts an alternative embodiment in which the input side bearing arrangement 18 is configured as a single large journal bearing 73, in place of the ball bearing shown in FIG. 2. The output side bearing arrangement 20 is formed by two tapered roller bearings 40, which in this case are mounted in an "O" configuration. Since the journal bearings used in this example cannot absorb axial forces, the two tapered roller bearings 40 are loaded by a bearing lock nut 74, threaded onto the support journal 28, against a shoulder 76, located between them. This positions the wheel hub 14 axially on the support journal 28. In this embodiment, the internal gear 60 is held in place by a positive locking mechanism, such as pins 61. Other details of this embodiment are identical to the embodiment of FIG. 2, and therefore are omitted here.

FIG. 4 depicts another embodiment using tapered roller bearings 75, 77 for both the input and output side bearing arrangements 18, 20, respectively. The input side bearing 75 preferably is approximately three times the diameter of the output side bearing 77. These two tapered roller bearings are also mounted in an "O" configuration and are loaded by the bearing lock nut 74 against shoulders 79, 81. Other details of this embodiment are identical to the embodiment of FIG. 2, and therefore will be omitted here.

Figure 5:
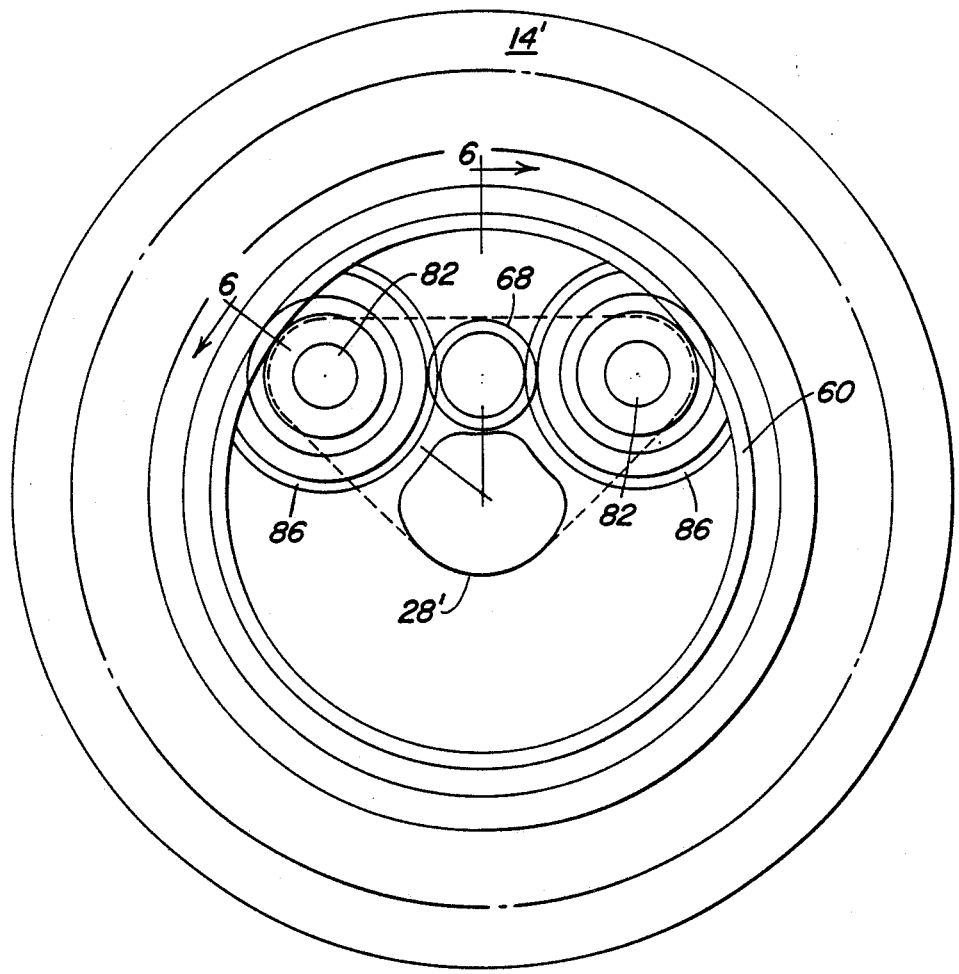
FIG. 5 is a view similar to FIG. 1 of an additional preferred embodiment according to the present invention.

FIGS. 5 and 6 are views analogous to FIGS. 1 and 2, respectively, of a further embodiment using a double reduction gear 80 in place of the single reduction gear 22. The wheel bearing support 10 has several changes. The wheel hub 14' is lengthened axially. The gear journals 30 are replaced by pins 82 which are retained by a ridge 84 on the support journal 28'. The support journal 28' also has been and plate 28 replaced with plate 28' (which has appropriate holes 83 to hold pins 82). The intermediate gears 70 are replaced by double gears 86, and the internal gear 60' is milled into the inner surface of the wheel hub 14', rather than being formed as a separate piece. Each double gear 86 has two gears with differing outside diameters which are rigidly connected to each other. The gear with the larger outside diameter meshes with the drive gear 68, while the gear with the smaller outside diameter meshes with the internal gear 60', as best seen in FIG. 6. The other elements can be identical to those in FIG. 1, and therefore are indicated with a few of the same reference numbers.

While the present invention has been described with respect to particular embodiments thereof, various modifications thereto will be readily apparent to one of ordinary skill in the art. Accordingly, the invention is intended to be limited only by the following claims.

We claim:
1. A wheel bearing support and driving mechanism for a driven wheel, comprising:
 a wheel bearing support carrier having a plate with a first side having pivot means thereon for pivotally mounting a support carrier to pivot about a pivot axis and a second side opposite said first side having a wheel hub support journal extending therefrom;
 a wheel hub rotatably mounted on said plate by an input side bearing arrangement and on said support journal by an output side bearing arrangement for rotation about a wheel hub rotation axis co-axial with said support journal;

a drive shaft rotatable about an axis eccentric to the wheel hub rotational axis, said drive shaft extending through said plate and said input side bearing arrangement and having a universal joint therein having a center co-axial with the pivot axis of said pivot means of said support carrier; and an internal gear rigidly connected to said wheel hub, said internal gear being driven by said drive shaft.

2. The arrangement according to claim 1, wherein said internal gear and said wheel hub consist of a single piece.

3. The arrangement according to claim 1, wherein said internal gear is connected to said wheel hub by means for friction locking.

4. The arrangement according to claim 1, wherein said output side bearing arrangement comprises two tapered roller bearings adjacent to each other.

5. The arrangement according to claim 1, wherein said input side bearing arrangement comprises journal bearings.

6. The arrangement according to claim 1, wherein each bearing arrangement is formed by a tapered roller bearing, the two arrangements being in an "O" configuration relative to each other, and wherein the output side tapered roller bearing has a considerably smaller diameter than the input side roller bearing.

7. The arrangement according to claim 1, further comprising a drive gear fixed to the end of said drive shaft and two intermediate gears for transmitting power from said drive gear to said internal gear, the intermediate gears and the drive gear being positioned radially within the internal gear.

8. The arrangement according to claim 7, wherein said intermediate gear are positioned within said wheel hub.

9. The arrangement according to claim 7, wherein each of said two intermediate gears comprises a double gear having two sets of gear teeth, with one of said sets of gear teeth meshing with said drive gear and the other of said sets of gear teeth meshing with said internal gear.

10. The arrangement according to claim 1, further comprising a washer supported by said wheel bearing support carrier and upon which one side of said wheel hub is supported, said washer having sealing lips extending axially therefrom towards said wheel bearing support carrier and said wheel bearing support carrier having sealing lips extending axially therefrom toward said washer, said washer sealing lips and said wheel bearing support carrier sealing lips together comprising a labyrinth seal.

11. The arrangement according to claim 4, wherein said output side bearings are in an "X" configuration relative to each other.

12. The arrangement according to claim 4, wherein said output side bearings are in an "O" configuration relative to each other.

13. The arrangement according to claim 12, further comprising axial support means for preventing axial motion of said output side bearings.

14. The arrangement of claim 1, wherein said entire wheel hub support carrier consists of a single piece.

15. The arrangement according to claim 1, wherein said internal gear is connected to said wheel hub by means for positive locking.

16. The arrangement according to claim 1, wherein said input side bearing arrangement comprises tapered roller bearings.

17. The arrangement according to claim 1, wherein said input side bearing arrangement comprises ball bearings.

* * * * *